(12) United States Patent
Takagi

(10) Patent No.: US 12,228,466 B2
(45) Date of Patent: Feb. 18, 2025

(54) ANNULAR BODY, WAVE REDUCER, ROBOT, AND TORQUE DETECTION DEVICE

(71) Applicant: Nidec-Shimpo Corporation, Nagaokakyo (JP)

(72) Inventor: Daisuke Takagi, Nagaokakyo (JP)

(73) Assignee: Nidec-Shimpo Corporation, Kyoto (JP)

( * ) Notice: Subject to any disclaimer, the term of this patent is extended or adjusted under 35 U.S.C. 154(b) by 272 days.

(21) Appl. No.: 17/901,892

(22) Filed: Sep. 2, 2022

(65) Prior Publication Data

US 2023/0071143 A1   Mar. 9, 2023

(30) Foreign Application Priority Data

Sep. 6, 2021   (JP) ................................ 2021-144958

(51) Int. Cl.
| | | |
|---|---|---|
| *G01L 3/10* | (2006.01) | |
| *B25J 9/10* | (2006.01) | |
| *B25J 13/08* | (2006.01) | |
| *G01L 5/22* | (2006.01) | |

(52) U.S. Cl.
CPC ............. *G01L 3/108* (2013.01); *B25J 9/1025* (2013.01); *B25J 13/085* (2013.01); *G01L 5/226* (2013.01)

(58) Field of Classification Search
None
See application file for complete search history.

(56) References Cited

U.S. PATENT DOCUMENTS

| | | | | |
|---|---|---|---|---|
| 6,962,088 B2 * | 11/2005 | Horiuchi | ............... | F16H 49/001 |
| | | | | 73/862.338 |
| 2004/0079174 A1 * | 4/2004 | Horiuchi | ............... | G01L 3/1457 |
| | | | | 73/862.338 |
| 2004/0261545 A1 * | 12/2004 | Kanayama | ............ | G01L 3/1457 |
| | | | | 73/862.326 |
| 2018/0235724 A1 * | 8/2018 | Nowatschin | ............. | B25J 13/02 |
| 2023/0258257 A1 * | 8/2023 | Takagi | ..................... | F16H 57/01 |
| | | | | 74/413 |

FOREIGN PATENT DOCUMENTS

| | | |
|---|---|---|
| JP | 2000-131160 A | 5/2000 |
| JP | 2021-014876 A | 2/2021 |

* cited by examiner

*Primary Examiner* — Patrick Assouad
*Assistant Examiner* — Mark A Shabman
(74) *Attorney, Agent, or Firm* — Keating & Bennett, LLP

(57) ABSTRACT

An annular body includes a base portion and a resistance wire located in the base portion and including first and second resistance wire portions. The first resistance wire portion includes first regions arranged at intervals in the circumferential direction and each including a region in which a first portion extending in a direction including components in both the radial direction and the circumferential direction is repeatedly provided in the circumferential direction. The second resistance wire portion includes the second regions arranged at intervals in the circumferential direction and each including a region in which a second portion extending in a direction including components in both the radial direction and the circumferential direction is repeatedly arranged in the circumferential direction.

20 Claims, 13 Drawing Sheets

ANNULAR BODY, WAVE REDUCER, ROBOT, AND TORQUE DETECTION DEVICE

CROSS-REFERENCE TO RELATED APPLICATIONS

The present application claims priority under 35 U.S.C. § 119 to Japanese Patent Application No. 2021-144958, filed on Sep. 6, 2021, the entire contents of which are hereby incorporated herein by reference.

1. FIELD OF THE INVENTION

The present disclosure relates to an annular body, a wave reducer, a robot, and a torque detection device.

2. BACKGROUND

In recent years, demand for a wave reducer mounted on a joint of a robot and the like is increased. In a conventional wave reducer, a strain gauge is attached to an external gear that rotates at a rotational speed after deceleration. This enables detection of torque applied to the external gear.

However, in the conventional structure, in a case where an output signal of the strain gauge greatly changes, it is not possible to distinguish whether the change in the output signal is caused by application of large torque or occurrence of abnormality in a resistance wire of the strain gauge.

SUMMARY

An annular body according to an example embodiment of the present disclosure includes a base portion surrounding a central axis and expanding in a direction intersecting the central axis and a resistance wire in the base portion. The resistance wire includes a first resistance wire portion and a second resistance wire portion located radially outside the first resistance wire portion, the first resistance wire portion includes an inner first resistance wire portion and an outer first resistance wire portion located radially outside the inner first resistance wire portion, the second resistance wire portion includes an inner second resistance wire portion and an outer second resistance wire portion located radially outside the inner second resistance wire portion, each of the inner first resistance wire portion and the outer first resistance wire portion includes first regions arranged at intervals in a circumferential direction, each of a plurality of the first regions includes a region in which a first portion extending in a direction including components in both a radial direction and the circumferential direction is repeatedly provided in the circumferential direction, each of the inner second resistance wire portion and the outer second resistance wire portion includes second regions arranged at intervals in the circumferential direction, and each of a plurality of the second regions includes a region in which a second portion extending in a direction including components in both the radial direction and the circumferential direction is repeatedly provided in the circumferential direction.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present application will be described with reference to the drawings.

Figure 1:
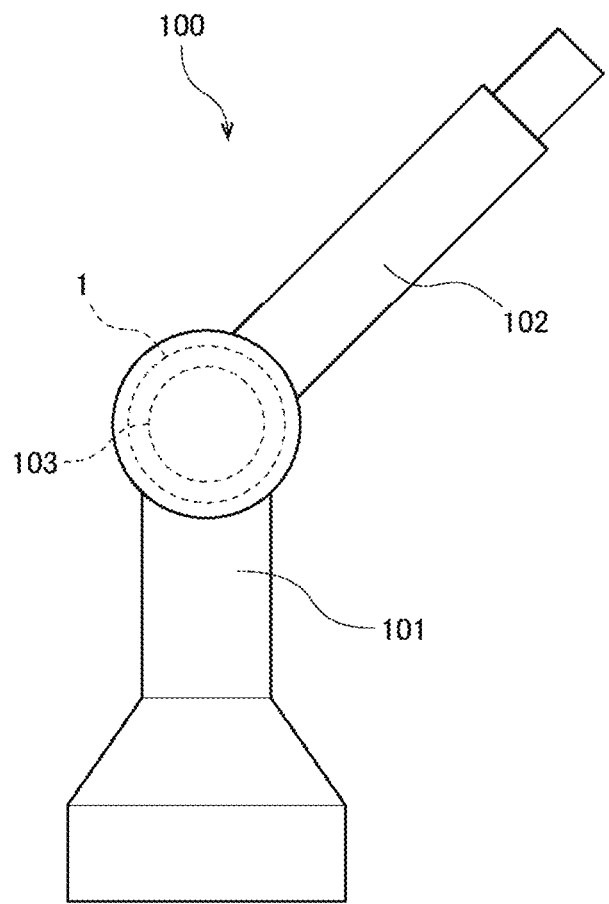
FIG. 1 is a schematic view of a robot according to an example embodiment of the present disclosure.

FIG. 1 is a schematic diagram illustrating a robot 100 equipped with a wave reducer 1 according to an example embodiment of the present disclosure. For example, the robot 100 is what is called an industrial robot that performs operations such as conveyance, processing, and assembly of components in a manufacturing line of an industrial product. As illustrated in FIG. 1, the robot 100 includes a base frame 101, an arm 102, a motor 103, and the wave reducer 1.

The arm 102 is rotatably supported with respect to the base frame 101. The motor 103 and the wave reducer 1 are incorporated in a joint between the base frame 101 and the arm 102. When a drive current is supplied to the motor 103, a rotational motion is output from the motor 103. Furthermore, the rotational motion output from the motor 103 is decelerated by the wave reducer 1 and transmitted to the arm 102. Thus, the arm 102 rotates with respect to the base frame 101 at a speed after deceleration.

As described above, the robot 100 includes the wave reducer 1. As described later, the wave reducer 1 has a function of detecting torque by a resistance wire. Further, the wave reducer 1 has a function of diagnosing a state of the resistance wire. Thus, the high-performance robot 100 can be realized.

Subsequently, a detailed structure of the wave reducer 1 will be described.

Note that, in the present application, a direction parallel to a central axis 9 of the wave reducer 1 is referred to as an "axial direction", a direction perpendicular to the central axis 9 of the wave reducer 1 is referred to as a "radial direction", and a direction along an arc around the central axis 9 of the wave reducer 1 is referred to as a "circumferential direction". Note that the term "parallel" as used above includes both "parallel" and "substantially parallel". Moreover, the term "perpendicular" as used above includes both "perpendicular" and "substantially perpendicular".

Figure 2:
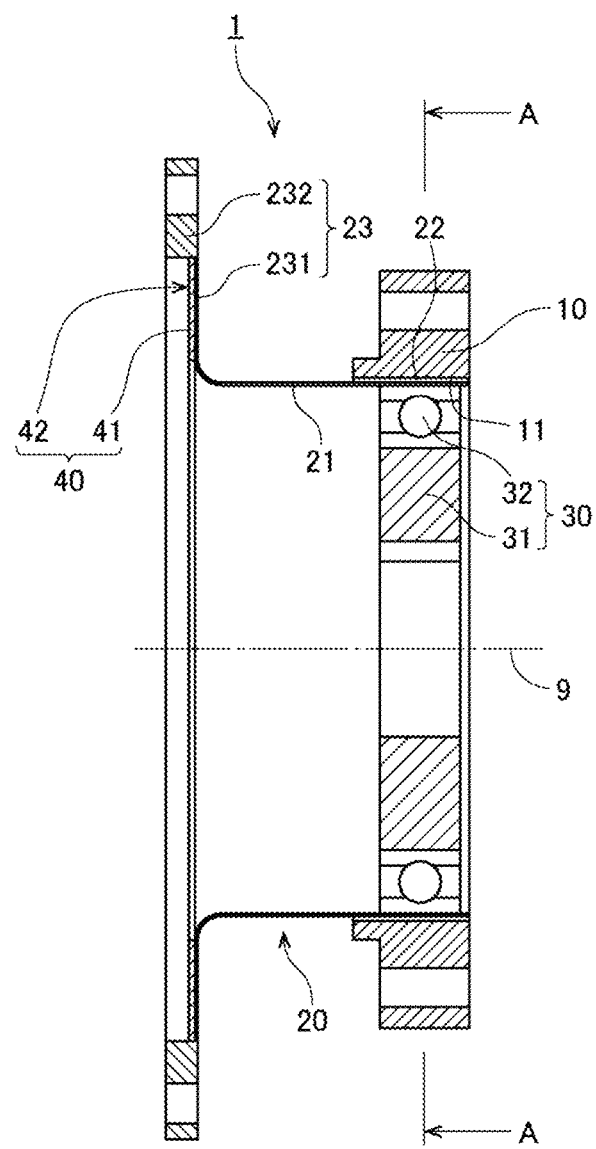
FIG. 2 is a longitudinal sectional view of a wave reducer according to an example embodiment of the present disclosure.
Figure 3:
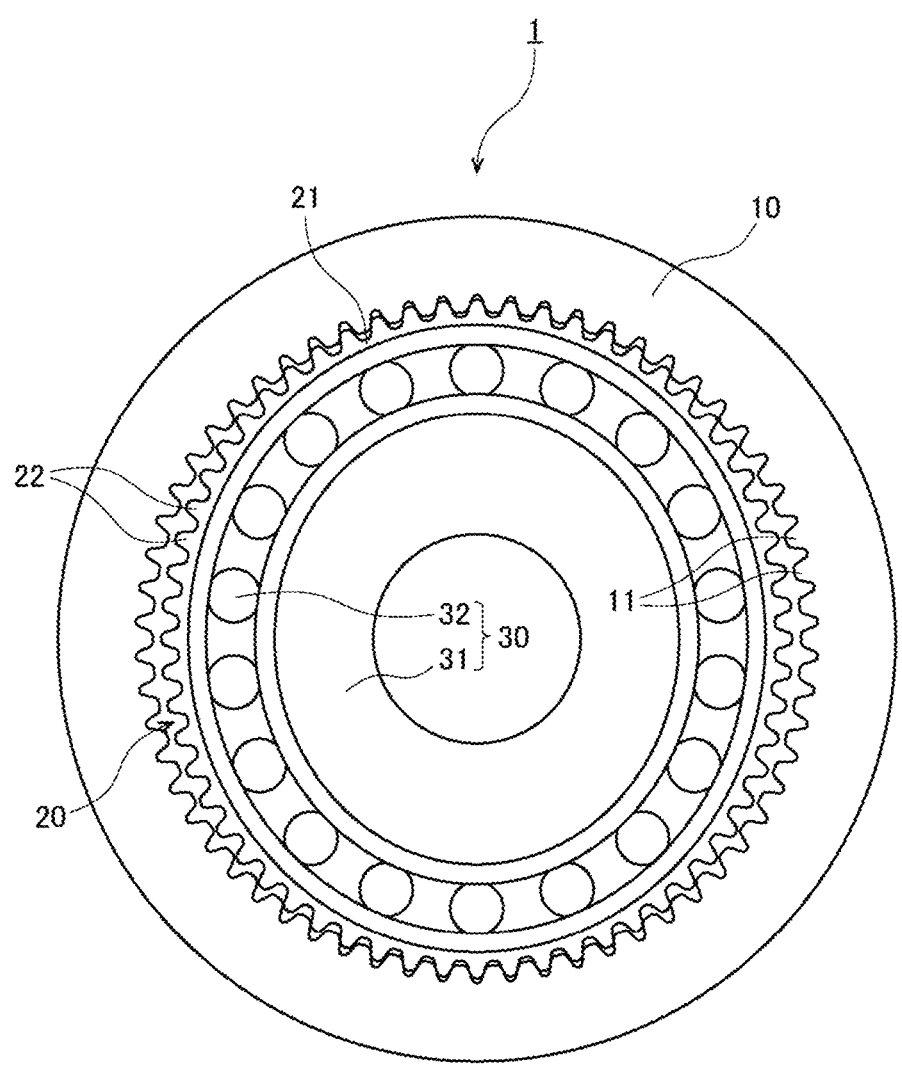
FIG. 3 is a transverse sectional view of the wave reducer.

FIG. 2 is a longitudinal sectional view illustrating the wave reducer 1 of the present example embodiment. FIG. 3 is a transversely sectional view illustrating the wave reducer 1 when viewed from an A-A position in FIG. 2. To avoid complication of the diagram, hatch lines indicating a section are not illustrated in FIG. 3. The wave reducer 1 is a device that decelerates rotational motion at a first rotational speed obtained from the motor 103 to a second rotational speed lower than the first rotational speed. As illustrated in FIGS. 1 and 2, the wave reducer 1 of the present example embodiment includes an internal gear 10, an annular body 20, and a wave generator 30. The annular body 20 has a function of detecting torque by a resistance wire as described later. Further, the annular body 20 has a function of diagnosing a state of a resistance wire. In this manner, the wave reducer 1 having a high function can be realized.

That is, in the wave reducer 1, torque applied to the annular body 20 can be detected, and a state of a resistance wire arranged in the annular body 20 can be diagnosed. More specifically, it is possible to diagnose whether a resistance wire functions normally. In the present example embodiment, the annular body 20 is a flexible external gear. However, the annular body may be a member other than an external gear.

The internal gear 10 is an annular gear around the central axis 9. The internal gear 10 is fixed to the base frame 101. The internal gear 10 is arranged to be coaxial with the central axis 9. The internal gear 10 is arranged radially outside an external tooth 22 described later. Rigidity of the internal gear 10 is sufficiently higher than rigidity of a body 21 described later of the annular body 20. For this reason, the internal gear 10 can be regarded as a substantially rigid body. The internal gear 10 has a plurality of internal teeth 11. A plurality of the internal teeth 11 protrude radially inward from a radially inner surface of the internal gear 10. A plurality of the internal teeth 11 are arrayed at a constant pitch in the circumferential direction on an inner circumferential surface of the internal gear 10.

The annular body 20 is an annular gear that is flexurally deformable. The annular body 20 is fixed to the arm 102. The annular body 20 is supported so as to be rotatable about the central axis 9.

As illustrated in FIGS. 2 and 3, the annular body 20 includes the body 21 and a plurality of the external teeth 22. The annular body 20 further includes an annular plate portion 23.

The body 21 is a cylindrical portion extending in the axial direction from a radial end portion of a base portion 231 described later. In the present example embodiment, the body 21 extends from a radially inner end portion of the base portion 231 toward a first side in the axial direction. An end portion on the first side in the axial direction of the body 21 is located radially outside the wave generator 30 and radially inside the internal gear 10. The body 21 is deformable in the radial direction because the body 21 has flexibility. In particular, a first end in the axial direction of the body 21 can be displaced in the radial direction more than other portions.

A plurality of the external teeth 22 protrude radially outward from a radially outer surface of the body 21. A plurality of the external teeth 22 are arranged on a radially outer surface at a first axial end of the body 21. A plurality of the external teeth 22 are arrayed at a constant pitch in the circumferential direction. A part of a plurality of the external teeth 22 and a part of a plurality of the internal teeth 11 described above mesh with each other. The number of the internal teeth 11 included in the internal gear 10 is slightly different from the number of the external teeth 22 included in the annular body 20.

The annular plate portion 23 includes the base portion 231 and a thick portion 232. That is, the annular body 20 has the base portion 231. The base portion 231 surrounds the central axis 9 and expands in a direction intersecting the central axis 9. The base portion 231 preferably expands along a plane orthogonal to the central axis 9. The base portion 231 expands radially outward from an end portion on a second side in the axial direction of the body 21. The base portion 231 has an annular shape surrounding the central axis 9. The base portion 231 can be slightly flexurally deformed because the base portion 231 is thin.

The thick portion 232 is an annular portion located radially outside the base portion 231. The thick portion 232 further expands radially outward from an end portion on the radially outer side of the base portion 231. Thickness in the axial direction of the thick portion 232 is larger than thickness in the axial direction of the base portion 231. The thick portion 232 is fixed to the arm 102 with, for example, a bolt.

The wave generator 30 is a mechanism that generates periodical flexural deformation in the body 21. The wave generator 30 is arranged radially inward of the external teeth 22. The wave generator 30 of the present example embodiment includes a cam 31 and a flexible bearing 32. The cam 31 is supported so as to be rotatable about the central axis 9. A radially outer surface of the cam 31 has an elliptical shape when viewed in the axial direction. The flexible bearing 32 is a bearing that is flexurally deformable. The flexible bearing 32 is arranged between a radially outer surface of the cam 31 and a radially inner surface of the body 21 of the annular body 20. Accordingly, the cam 31 and the body 21 can rotate at different rotational speeds.

An inner ring of the flexible bearing 32 is in contact with a radially outer surface of the cam 31. An outer ring of the flexible bearing 32 is in contact with a radially inner surface of the body 21. For this reason, the body 21 is deformed in an elliptical shape along a radially outer surface of the cam 31. As a result, the external teeth 22 of the annular body 20 and the internal teeth 11 of the internal gear 10 mesh with each other at two positions corresponding to both ends of a major axis of the ellipse. At other positions in the circumferential direction, the external teeth 22 and the internal teeth 11 do not mesh with each other.

The cam 31 is connected to an output shaft (not illustrated) of the motor 103. When the motor 103 is driven, the cam 31 rotates at the first rotational speed about the central axis 9. In this manner, the major axis of the ellipse of the annular body 20 also rotates at the first rotational speed. Then, a meshing position between the external teeth 22 and the internal teeth 11 also changes at the first rotational speed in the circumferential direction. As described above, the number of internal teeth 11 of the internal gear 10 is slightly different from the number of the external teeth 22 of the annular body 20. Due to this difference in the number of teeth, the meshing position between the external teeth 22 and the internal teeth 11 slightly changes in the circumferential direction every rotation of the cam 31. As a result, the annular body 20 rotates about the central axis 9 with respect to the internal gear 10 at the second rotational speed lower than the first rotational speed.

Next, a torque detection device 40 will be described. The torque detection device 40 is a sensor for detecting torque applied to the annular body 20. As illustrated in FIG. 2, the torque detection device 40 includes a substrate 41 and a detection circuit 42. The substrate 41 is arranged on the base portion 231 of the annular body 20. Specifically, the base portion 231 includes a surface 234 that intersects the central axis 9 and expands in the annular shape about the central axis 9. The surface 234 is a surface on the second side in the axial direction of the base portion 231. The substrate 41 is fixed to the surface 234 of the base portion 231.

Figure 4:
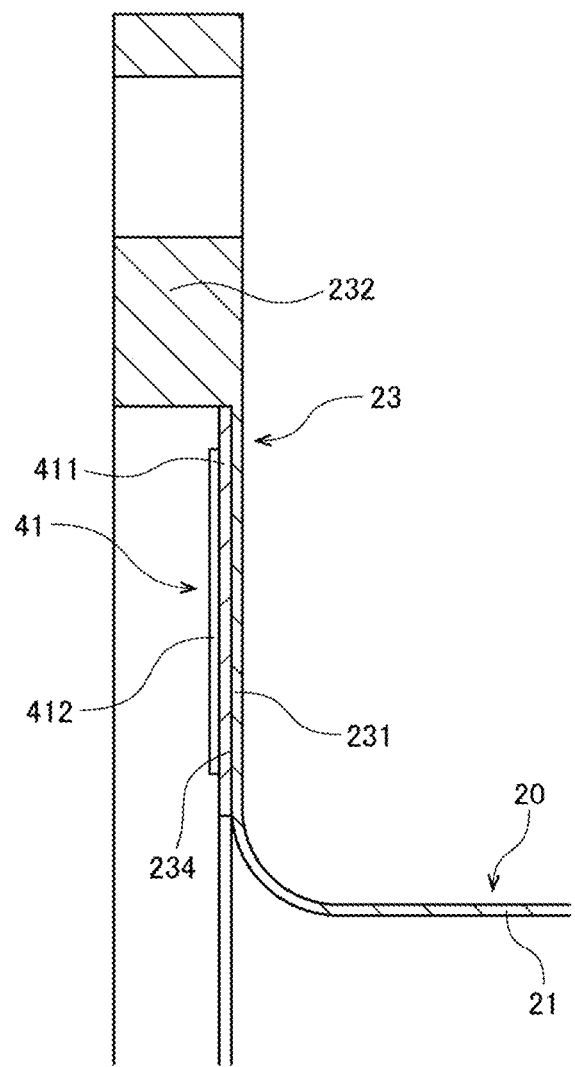
FIG. 4 is a partial longitudinal sectional view of an annular body according to an example embodiment of the present disclosure.
Figure 5:
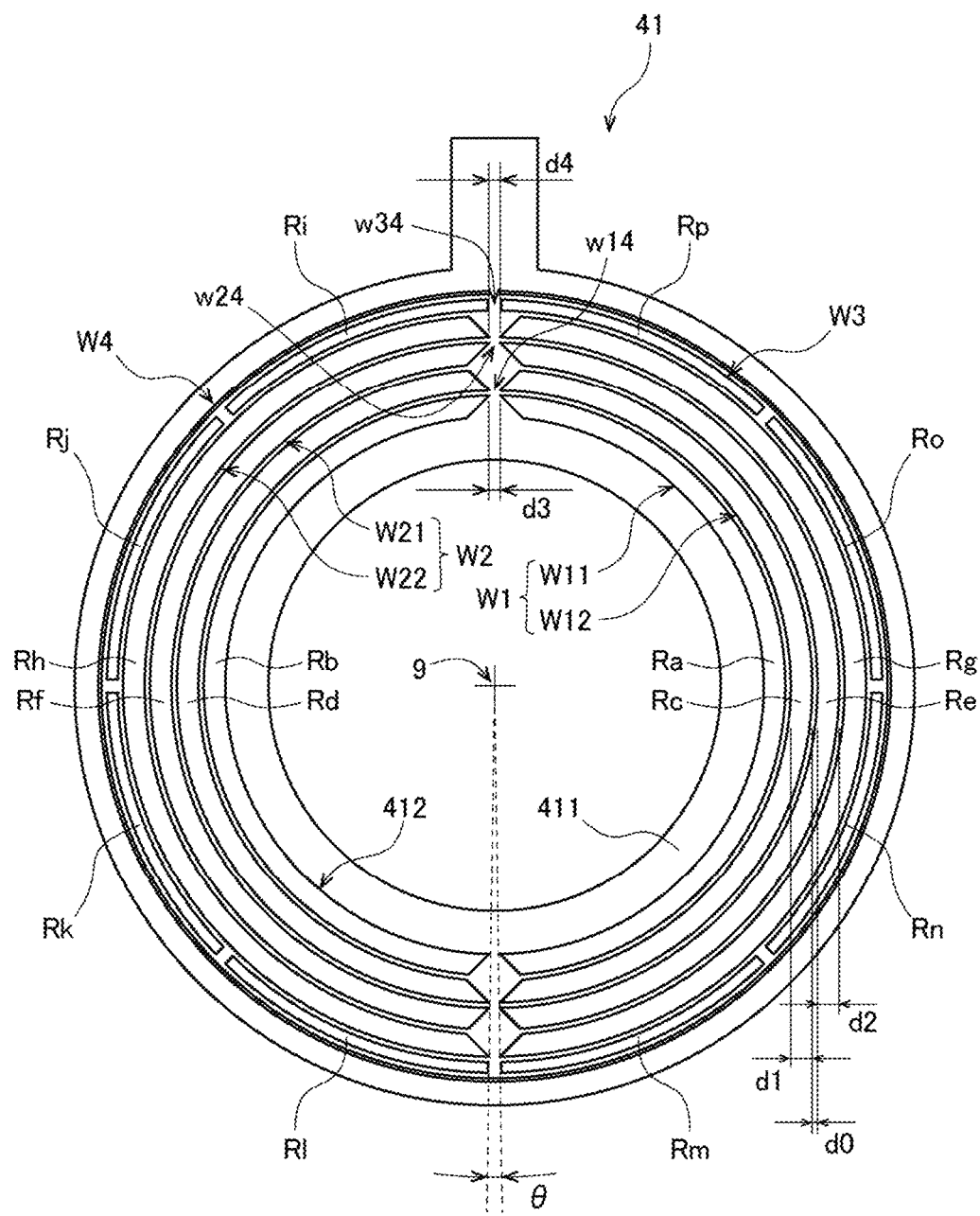
FIG. 5 is a plan view of a substrate according to an example embodiment of the present disclosure.

FIG. 4 is a partial longitudinal sectional view of the annular body 20 in the vicinity of the substrate 41. FIG. 5 is a plan view of the substrate 41. As illustrated in FIGS. 4 and 5, the substrate 41 includes an insulating layer 411 and a resistance wire 412. That is, the torque detection device 40 includes the resistance wire 412 and the detection circuit 42.

The insulating layer 411 is a flexibly deformable. The insulating layer 411 expands in a direction intersecting the central axis 9. The insulating layer 411 has an annular shape around the central axis 9. The insulating layer 411 is made from resin that is an insulator or an inorganic insulating material. The insulating layer 411 is arranged on the surface 234 of the base portion 231.

The resistance wire 412 is formed on a surface of the insulating layer 411. That is, the resistance wire 412 is arranged on the base portion 231. Metal that is a conductor is used as a material of the resistance wire 412. For example, a copper alloy, a chromium alloy, or copper is used as a material of the resistance wire 412. The resistance wire 412 is arranged in the circumferential direction with respect to the central axis 9. The resistance wire 412 includes a first resistance wire portion W1 and a second resistance wire portion W2. The second resistance wire portion W2 is arranged radially outside the first resistance wire portion W1.

The first resistance wire portion W1 includes an inner first resistance wire portion W11 and an outer first resistance wire portion W12. The outer first resistance wire portion W12 is arranged radially outward of the inner first resistance wire portion W11.

The inner first resistance wire portion W11 has a plurality of first regions Ra and Rb. A plurality of the first regions Ra and Rb are arranged at intervals in the circumferential direction. In the present example embodiment, the inner first resistance wire portion W11 has two of the first regions Ra and Rb. Each of two of the first regions Ra and Rb is provided in a semicircular arc shape in a range of about 180° around the central axis 9. Two of the first regions Ra and Rb are arranged concentrically and line-symmetrically. Further, a radial distance from the central axis 9 to the first region Ra is substantially equal to a radial distance from the central axis 9 to the first region Rb.

Figure 6:
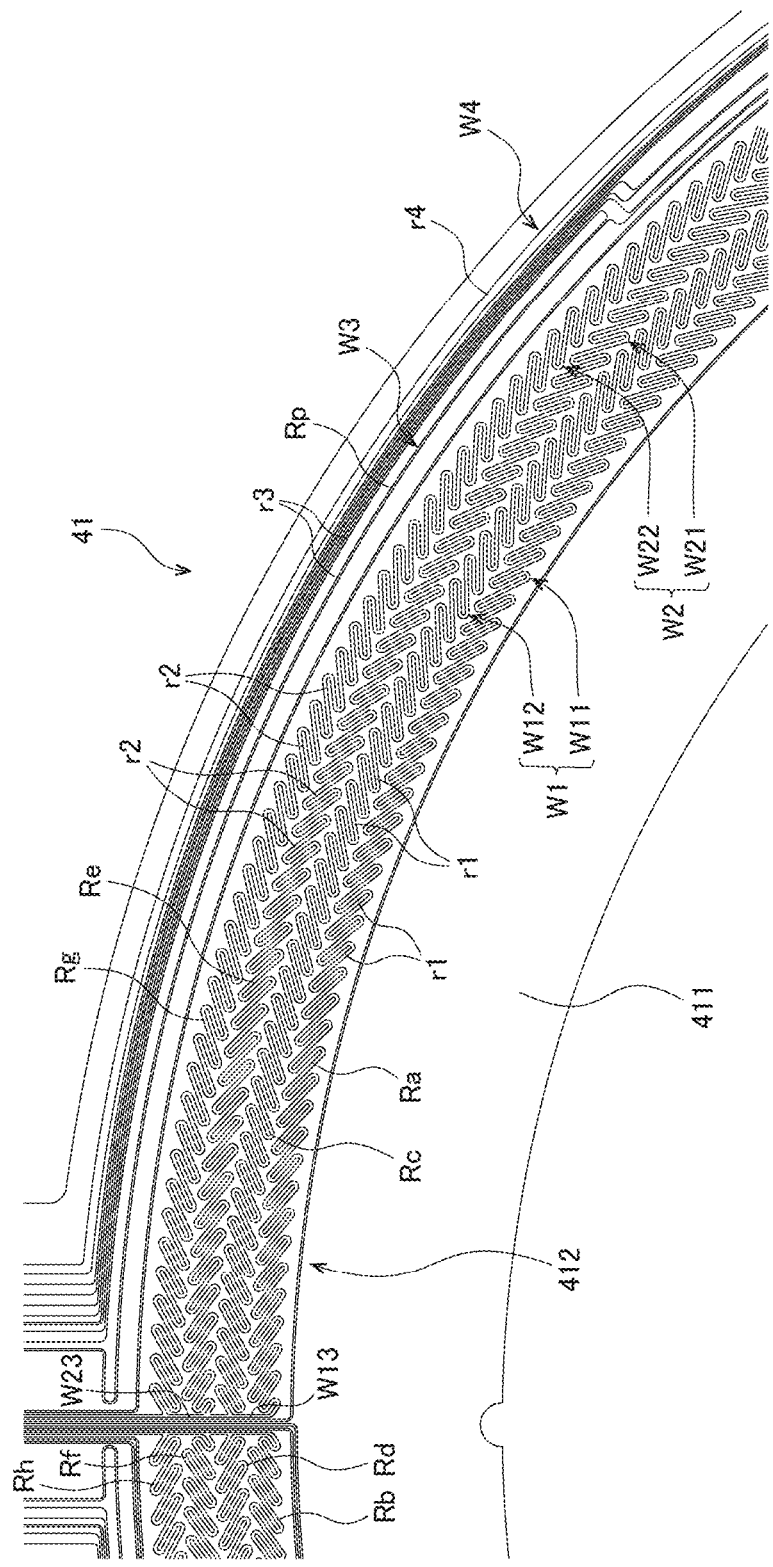
FIG. 6 is a partial plan view of the substrate.

FIG. 6 is a partial plan view of the substrate 41. As illustrated in FIG. 6, each of a plurality of the first regions Ra and Rb includes a region in which a first portion r1 extending in a direction of having components in both the radial direction and the circumferential direction is repeatedly arranged in the circumferential direction. Specifically, each of two of the first regions Ra and Rb extends in the circumferential direction while one conductive wire is bent in a zigzag manner. A plurality of the first portions r1 are arrayed in the circumferential direction in a posture substantially parallel to each other. The first portion r1 of the first region Ra of two of the first regions Ra and Rb is inclined to the first side in the circumferential direction with respect to the radial direction. The first portion r1 of the first region Rb is inclined to the second side in the circumferential direction with respect to the radial direction. For example, an inclination angle of the first portion r1 with respect to the radial direction is 45°. End portions of the first portions r1 adjacent to each other in the circumferential direction are alternately connected on the radial inside or the radial outside. Thus, a plurality of the first portions r1 are connected in series as a whole.

The outer first resistance wire portion W12 has a plurality of first regions Rc and Rd. A plurality of the first regions Rc and Rd are arranged at intervals in the circumferential direction. In the present example embodiment, the outer first resistance wire portion W12 has two of the first regions Rc and Rd. Each of two of the first regions Rc and Rd is provided in a semicircular arc shape in a range of about 180° around the central axis 9. Two of the first regions Rc and Rd are arranged concentrically and line-symmetrically. Further, a radial distance from the central axis 9 to the first region Rc is substantially equal to a radial distance from the central axis 9 to the first region Rd.

As illustrated in FIG. 6, each of a plurality of the first regions Rc and Rd includes a region in which the first portion r1 extending in a direction of having components in both the radial direction and the circumferential direction is repeatedly arranged in the circumferential direction. Specifically, each of two of the first regions Rc and Rd extends in the circumferential direction while one conductive wire is bent in a zigzag manner. A plurality of the first portions r1 are arrayed in the circumferential direction in a posture substantially parallel to each other. The first portion r1 of the first region Rc of two of the first regions Rc and Rd is inclined to the second side in the circumferential direction with respect to the radial direction. The first portion r1 of the first region Rd is inclined to the first side in the circumferential direction with respect to the radial direction. For example, an inclination angle of the first portion r1 with respect to the radial direction is 45°. End portions of the first portions r1 adjacent to each other in the circumferential direction are alternately connected on the radial inside or the radial outside. Thus, a plurality of the first portions r1 are connected in series as a whole.

The second resistance wire portion W2 includes an inner second resistance wire portion W21 and an outer second resistance wire portion W22. The outer second resistance wire portion W22 is arranged radially outward of the inner second resistance wire portion W21.

The inner second resistance wire portion W21 has a plurality of second regions Re and Rf. A plurality of the second regions Re and Rf are arranged at intervals in the circumferential direction. In the present example embodiment, the inner second resistance wire portion W21 has two of the second regions Re and Rf. Each of two of the second regions Re and Rf is provided in a semicircular arc shape in a range of about 180° around the central axis 9. Two of the second regions Re and Rf are arranged concentrically and line-symmetrically. Further, a radial distance from the central axis 9 to the second region Re is substantially equal to a radial distance from the central axis 9 to the second region Rf.

As illustrated in FIG. 6, each of a plurality of the second regions Re and Rf includes a region in which a second portion r2 extending in a direction of having components in both the radial direction and the circumferential direction is repeatedly arranged in the circumferential direction. Specifically, each of two of the second regions Re and Rf extends in the circumferential direction while one conductive wire is bent in a zigzag manner. A plurality of the second portions r2 are arrayed in the circumferential direction in a posture substantially parallel to each other. The second portion r2 of the second region Re of two of the second regions Re and Rf is inclined to the first side in the circumferential direction with respect to the radial direction. The second portion r2 of the second region Rf is inclined to the second side in the circumferential direction with respect to the radial direction. For example, an inclination angle of the second portion r2 with respect to the radial direction is 45°. End portions of the second portions r2 adjacent to each other in the circumferential direction are alternately connected on the radial inside or the radial outside. Thus, a plurality of the second portions r2 are connected in series as a whole.

The outer second resistance wire portion W22 has a plurality of second regions Rg and Rh. A plurality of the second regions Rg and Rh are arranged at intervals in the circumferential direction. In the present example embodiment, the outer second resistance wire portion W22 has two of the second regions Rg and Rh. Each of two of the second regions Rg and Rh is provided in a semicircular arc shape in a range of about 180° around the central axis 9. Two of the second regions Rg and Rh are arranged concentrically and line-symmetrically. Further, a radial distance from the central axis 9 to the second region Rg is substantially equal to a radial distance from the central axis 9 to the second region Rh.

As illustrated in FIG. 6, each of a plurality of the second regions Rg and Rh includes a region in which the second portion r2 extending in a direction of having components in both the radial direction and the circumferential direction is repeatedly arranged in the circumferential direction. Specifically, each of two of the second regions Rg and Rh extends in the circumferential direction while one conductive wire is bent in a zigzag manner. A plurality of the second portions r2 are arrayed in the circumferential direction in a posture substantially parallel to each other. The second portion r2 of the second region Rg of two of the second regions Rg and Rh is inclined to the second side in the circumferential direction with respect to the radial direction. The second portion r2 of the second region Rh is inclined to the first side in the circumferential direction with respect to the radial direction. For example, an inclination angle of the second portion r2 with respect to the radial direction is 45°. End portions of the second portions r2 adjacent to each other in the circumferential direction are alternately connected on the radial inside or the radial outside. Thus, a plurality of the second portions r2 are connected in series as a whole.

Figure 7:
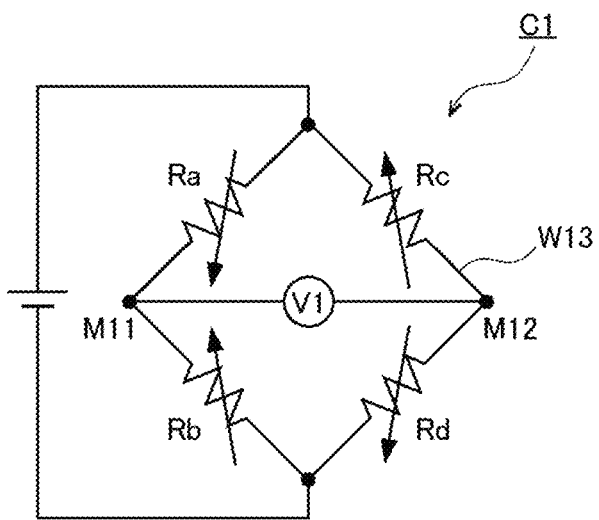
FIG. 7 is a circuit diagram of a first bridge circuit according to an example embodiment of the present disclosure.

FIG. 7 is a circuit diagram of a first bridge circuit C1 including four of the first regions Ra, Rb, Rc, and Rd of the first resistance wire portion W1. As illustrated in FIGS. 6 and 7, the first resistance wire portion W1 has a first connection region W13 connected to a plurality of the first regions Ra, Rb, Rc, and Rd. In the present example embodiment, the number of the first regions Ra, Rb, Rc, and Rd is four. A plurality of the first regions Ra, Rb, Rc, and Rd are connected via the first connection region W13. Thus, the first bridge circuit C1 is formed.

The first region Ra and the first region Rb are connected in series in this order. The first region Rc and the first region Rd are connected in series in this order. Then, columns of two of the first regions Ra and Rb and columns of two of the first regions Rc and Rd are connected in parallel between a positive pole and a negative pole of power supply voltage. Further, an intermediate point M11 between two of the first regions Ra and Rb and an intermediate point M12 between two of the first regions Rc and Rd are connected to a first voltmeter V1.

A resistance value of each of the first portions r1 changes according to torque applied to a region where the resistance wire 412 is arranged. That is, in the present example embodiment, a resistance value of each of the first portions r1 of four of the first regions Ra, Rb, Rc, and Rd changes according to torque applied to the base portion 231. For example, when torque toward the first side in the circumferential direction is applied to the base portion 231 around the central axis 9, a resistance value of each of the first portions r1 of two of the first regions Ra and Rd decreases, and a resistance value of each of the first portions r1 of other two of the first regions Rb and Rc increases. On the other hand, when torque toward the second side in the circumferential direction is applied to the base portion 231 around the central axis 9, a resistance value of each of the first portions r1 of two of the first regions Ra and Rd increases, and a resistance value of each of the first portions r1 of the first regions Rb and Rc decreases. As described above, two of the first regions Ra and Rd and two of the first regions Rb and Rc show resistance value changes in directions opposite to each other with respect to the torque.

When resistance values of four of the first regions Ra, Rb, Rc, and Rd change, a potential difference between the intermediate point M11 of two of the first regions Ra and Rb and the intermediate point M12 of two of the first regions Rc and Rd changes, so that a measurement value of the first voltmeter V1 also changes. Accordingly, a direction and magnitude of torque applied to the base portion 231 can be detected based on a measurement value of the first voltmeter V1.

Figure 8:
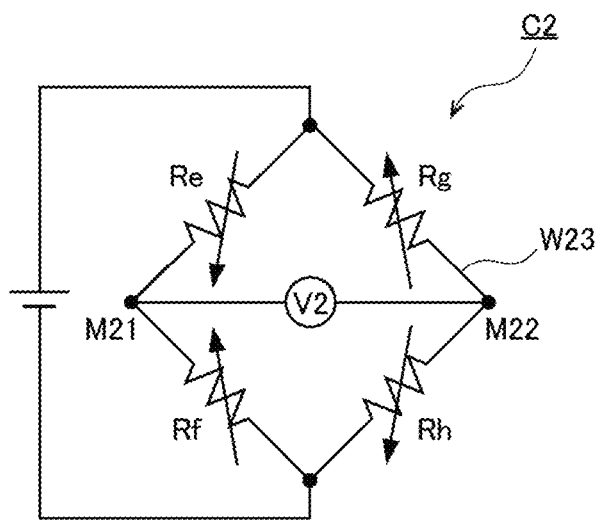
FIG. 8 is a circuit diagram of a second bridge circuit according to an example embodiment of the present disclosure.

FIG. 8 is a circuit diagram of a second bridge circuit C2 including four of the second regions Re, Rf, Rg, and Rh of the second resistance wire portion W2. As illustrated in FIGS. 6 and 8, the second resistance wire portion W2 has a second connection region W23 connected to a plurality of the second regions Re, Rf, Rg, and Rh. In the present example embodiment, the number of the second regions Re, Rf, Rg, and Rh is four. A plurality of the second regions Re, Rf, Rg, and Rh are connected via the second connection region W23. Thus, the second bridge circuit C2 is formed.

The second region Re and the second region Rf are connected in series in this order. The second region Rg and the second region Rh are connected in series in this order. Then, columns of two of the second regions Re and Rf and columns of two of the second regions Rg and Rh are connected in parallel between a positive pole and a negative pole of power supply voltage. Further, an intermediate point M21 between two of the second regions Re and Rf and an intermediate point M22 between two of the second regions Rg and Rh are connected to a second voltmeter V2.

A resistance value of each of the second portions r2 changes according to torque applied to a region where the resistance wire 412 is arranged. In the present example embodiment, a resistance value of each of the second portions r2 of four of the second regions Re, Rf, Rg, and Rh changes according to torque applied to the base portion 231. For example, when torque toward the first side in the circumferential direction is applied to the base portion 231 around the central axis 9, a resistance value of each of the second portions r2 of two of the second regions Re and Rh decreases, and a resistance value of each of the second portions r2 of two of the second regions Rf and Rg increases. On the other hand, when torque toward the second side in the circumferential direction is applied to the base portion 231 around the central axis 9, a resistance value of each of the second portions r2 of two of the second regions Re and Rh increases, and a resistance value of each of the second portions r2 of two of the second regions Rf and Rg decreases. As described above, two of the second regions Re and Rh and two of the second regions Rf and Rg show resistance value changes in directions opposite to each other with respect to the torque.

When resistance values of four of the second regions Re, Rf, Rg, and Rh change, a potential difference between the intermediate point M21 of two of the second regions Re and Rf and the intermediate point M22 of two of the second regions Rg and Rh changes, so that a measurement value of the second voltmeter V2 also changes. Accordingly, a direction and magnitude of torque applied to the base portion 231 can be detected based on a measurement value of the second voltmeter V2.

As described above, in the present example embodiment, two bridge circuits of the first bridge circuit C1 and the second bridge circuit C2 are configured. As a result, even when abnormality occurs in one of the bridge circuits, torque can be detected by the other bridge circuit. Further, when abnormality occurs in any one of the bridge circuits, the abnormality can be detected.

Part of the first connection region W13 and part of the second connection region W23 may be connected to common power supply voltage in parallel, or may be connected to different power supply voltages. That is, power supply voltage may be divided for each bridge circuit. In a case where power supply voltage is divided for each bridge circuit, even when part of the power supply voltage does not function normally, the power supply voltage is supplied from another power supply voltage to at least one bridge circuit, so that torque can be detected by the bridge circuit.

The detection circuit 42 is electrically connected to the resistance wire 412. The detection circuit 42 may be attached to the annular body 20 or may be provided at a position away from the annular body 20. The detection circuit 42 outputs a first output signal Tr1 based on a measurement value of the first voltmeter V1 and a second output signal Tr2 based on a measurement value of the second voltmeter V2. However, the detection circuit 42 may output a signal based on the sum of an output signal of the first bridge circuit C1 and an output signal of the second bridge circuit C2. Specifically, the detection circuit 42 may output a detection signal indicating a direction and magnitude of torque applied to the base portion 231 based on the sum of the first output signal Tr1 based on a measurement value of the first voltmeter V1 and the second output signal Tr2 based on a measurement value of the second voltmeter V2. As a result, when the base portion 231 is affected by the cam 31 or the like depending on an angle of the base portion 231, a detection signal based on the sum of the first output signal Tr1 and the second output signal Tr2 at different angles is output, so that a detection signal in which the influence depending on the angle is reduced can be output. The detection circuit 42 may output a detection signal based on the linear sum of the first output signal Tr1 and the second output signal Tr2. Further, the detection circuit 42 may output a detection signal on the basis of a result obtained by substituting the first output signal Tr1 and the second output signal Tr2 into a predetermined function. The detection circuit 42 may output a detection signal based on any one of the first output signal Tr1 and the second output signal Tr2.

Figure 9:
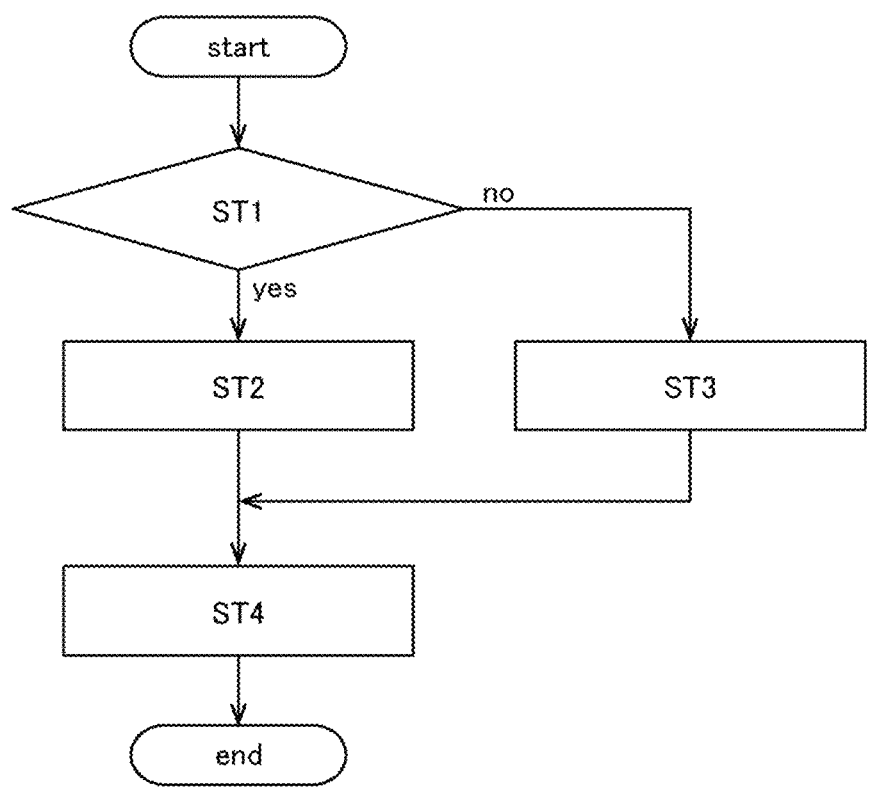
FIG. 9 is a flowchart illustrating a process of diagnosis processing according to an example embodiment of the present disclosure.

The detection circuit 42 has a diagnostic function of diagnosing a state of the resistance wire 412. Hereinafter, this diagnostic function will be described. FIG. 9 is a flowchart illustrating a process of diagnosis processing in the detection circuit 42. As illustrated in FIG. 9, the detection circuit 42 compares an output signal of the first bridge circuit C1 with an output signal of the second bridge circuit C2 to output a diagnostic signal indicating a state of the resistance wire 412. As a result, the torque detection device 40 can diagnose and output a state of the resistance wire 412.

Specifically, the detection circuit 42 first compares the first output signal Tr1 based on a measurement value of the first voltmeter V1 with the second output signal Tr2 based on a measurement value of the second voltmeter V2. Then, it is determined whether or not a relationship between the first output signal Tr1 and the second output signal Tr2 is within a normal range (Step ST1). For example, the detection circuit 42 determines whether or not a difference between the first output signal Tr1 and the second output signal Tr2 is less than a predetermined threshold.

When there is no abnormality such as disconnection in both the first resistance wire portion W1 and the second resistance wire portion W2, the first resistance wire portion W1 and the second resistance wire portion W2 show an approximate resistance value change with respect to torque applied to the base portion 231. For this reason, a difference between the first output signal Tr1 and the second output signal Tr2 is less than the predetermined threshold (yes in Step ST1). In this case, the detection circuit 42 outputs a first signal as a diagnostic signal indicating a state of the resistance wire 412 (Step ST2). The first signal is a diagnostic signal indicating that resistance wire 412 is not abnormal.

On the other hand, when there is abnormality such as disconnection in one of the first resistance wire portion W1 and the second resistance wire portion W2, the one of the first resistance wire portion W1 and the second resistance wire portion W2 shows a resistance value different from a normal resistance value. For this reason, a difference between the first output signal Tr1 and the second output signal Tr2 is equal to or more than the predetermined threshold (no in Step ST1). In this case, the detection circuit 42 outputs a second signal indicating that resistance wire 412 is abnormal (Step ST3).

In the processing of Step ST3, a current value of each of the first bridge circuit C1 and the second bridge circuit C2 may be checked. As a result, it is possible to determine which bridge circuit of the first bridge circuit C1 and the second bridge circuit C2 has abnormality. Then, only the second signal and an output signal of a normally functioning bridge circuit may be output. As a result, torque detection can be performed in the normally functioning bridge circuit.

When the detection circuit 42 determines that there is abnormality in the resistance wire 412 and current values of the first bridge circuit C1 and the second bridge circuit C2 are normal, it can be determined that abnormality occurs in a portion other than a bridge circuit. As a specific example, when the resistance wire 412 is peeled off the base portion 231, it is possible to detect that abnormality occurs in a portion other than a bridge circuit.

Note that Step ST2 described above may be omitted. That is, the detection circuit 42 may not output a diagnostic signal when a difference between an output signal of the first bridge circuit C1 and an output signal of the second bridge circuit C2 is less than the predetermined threshold. The detection circuit 42 may output a predetermined signal as a diagnostic signal when a difference between an output signal of the first bridge circuit C1 and an output signal of the second bridge circuit C2 is equal to or larger than a predetermined threshold. As a result, the torque detection device 40 can output a diagnosis result when abnormality occurs in one of the first bridge circuit C1 and the second bridge circuit C2.

After the above, the detection circuit 42 displays a diagnosis result (Step ST4). Specifically, the detection circuit 42 displays a diagnosis result indicated by a diagnostic signal on a display (not illustrated). As a result, the user of the wave reducer 1 or the robot 100 can know a state of the resistance wire 412. Note that the diagnosis result of Step ST4 described above may be displayed by a device other than the display or other means.

As described above, the annular body 20 includes the resistance wire 412 for detecting torque applied to the base portion 231. The resistance wire 412 includes a first resistance wire portion W1 and a second resistance wire portion W2. For this reason, a state of the resistance wire 412 can be diagnosed by comparing an output signal of the first resistance wire portion W1 with an output signal of the second resistance wire portion W2. That is, it is possible to realize the torque detection device 40 capable of detecting torque applied to the base portion 231 and constantly monitoring a state of the resistance wire 412.

In particular, in the present example embodiment, as illustrated in FIG. 5, a gap w14 in the circumferential direction between the first regions Ra, Rb, Rc, and Rd adjacent to each other in the circumferential direction and a gap w24 in the circumferential direction between the second regions Re, Rf, Rg, and Rh adjacent to each other in the circumferential direction are arranged at the same position in the circumferential direction. For this reason, influence depending on an angle in the circumferential direction can be approximated in the first resistance wire portion W1 and the second resistance wire portion W2. Therefore, a state of the resistance wire 412 can be diagnosed more accurately by comparing an output signal of the first resistance wire portion W1 with an output signal of the second resistance wire portion W2.

In the present example embodiment, the number of the first regions Ra and Rb included in the inner first resistance wire portion W11, the number of the first regions Rc and Rd included in the outer first resistance wire portion W12, the number of the second regions Re and Rf included in the inner second resistance wire portion W21, and the number of the second regions Rg and Rh included in the outer second resistance wire portion W22 are the same. Specifically, all of the number of the first regions Ra and Rb included in the inner first resistance wire portion W11, the number of the first regions Rc and Rd included in the outer first resistance wire portion W12, the number of the second regions Re and Rf included in the inner second resistance wire portion W21, and the number of the second regions Rg and Rh included in the outer second resistance wire portion W22 are two. The gap w14 in the circumferential direction between the first regions Ra and Rb adjacent to each other in the circumferential direction in the inner first resistance wire portion W11, the gap w14 in the circumferential direction between the first regions Rc and Rd adjacent to each other in the circumferential direction in the outer first resistance wire portion W12, the gap w24 in the circumferential direction between the second regions Re and Rf adjacent to each other in the circumferential direction in the inner second resistance wire portion W21, and the gap w24 in the circumferential direction between the second regions Rg and Rh adjacent to each other in the circumferential direction in the outer second resistance wire portion W22 are arranged at the same position in the circumferential direction.

In this way, in the first resistance wire portion W1 and the second resistance wire portion W2, influence depending on an angle in the circumferential direction occurs under substantially the same condition. Therefore, a state of the resistance wire 412 can be diagnosed more accurately by comparing an output signal of the first resistance wire portion W1 with an output signal of the second resistance wire portion W2.

When the wave reducer 1 is driven, cyclic flexural deformation occurs in the annular body 20. Therefore, an output signal of the first resistance wire portion W1 and an output signal of the second resistance wire portion W2 include a component reflecting torque originally to be measured and an error component (ripple error) caused by cyclic flexural deformation of the annular body 20. The ripple error changes according to a rotation angle of rotational motion input to the annular body 20.

Figure 10:
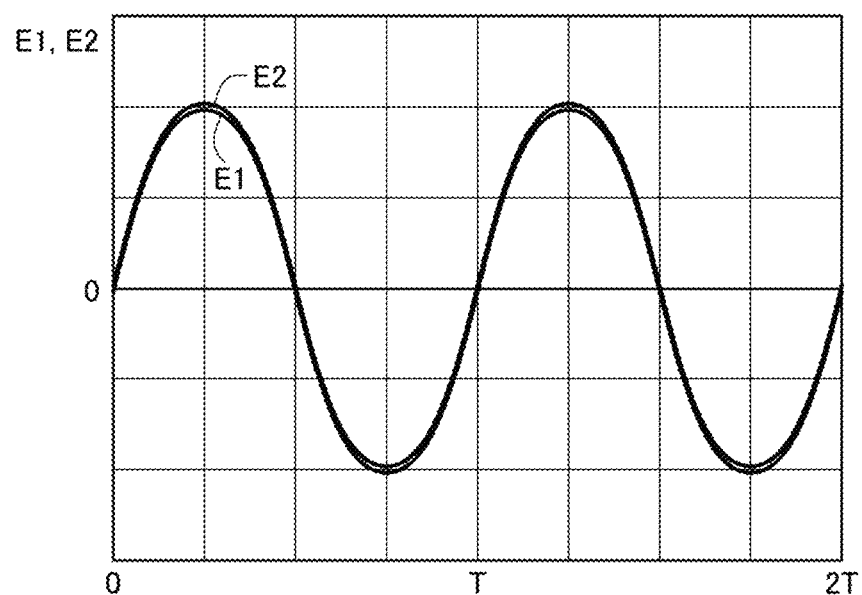
FIG. 10 is a graph illustrating temporal changes of a ripple error of a first resistance wire portion and a ripple error of a second resistance wire portion according to an example embodiment of the present disclosure.

FIG. 10 is a graph illustrating temporal changes of a ripple error E1 of the first resistance wire portion W1 and a ripple error E2 of the second resistance wire portion W2. The horizontal axis of the graph of FIG. 10 represents time. The vertical axis of the graph of FIG. 10 represents a value obtained by normalizing voltage representing a ripple error. These ripple errors E1 and E2 correspond to the above-described "influence depending on an angle in the circumferential direction". As described above, in the present example embodiment, the gap w14 in the circumferential direction between the first regions Ra, Rb, Rc, and Rd adjacent to each other in the circumferential direction and the gap w24 in the circumferential direction between the second regions Re, Rf, Rg, and Rh adjacent to each other in the circumferential direction are arranged at the same position in the circumferential direction. For this reason, the ripple error E1 of the first resistance wire portion W1 and the ripple error E2 of the second resistance wire portion W2 have approximate waveforms. For this reason, even if ripple correction described later is not performed, a state of the resistance wire 412 can be accurately diagnosed by comparing a difference between an output signal of the first resistance wire portion W1 and that of the second resistance wire portion W2 with the predetermined threshold. As described above, the ripple errors E1 and E2 illustrated in the graph of FIG. 10 are values obtained by normalizing voltage. As the above-described "influence depending on an angle in the circumferential direction", a strain amount may be used instead of a value obtained by normalizing voltage.

In the present example embodiment, the first resistance wire portion W1 and the second resistance wire portion W2 are concentrically arranged about the central axis 9. In this way, a difference between an output signal of the first resistance wire portion W1 and an output signal of the second resistance wire portion W2 can be reduced as compared with a case where the center of the first resistance wire portion W1 and the center of the second resistance wire portion W2 are shifted from each other. Therefore, a state of the resistance wire 412 can be diagnosed more accurately by comparing an output signal of the first resistance wire portion W1 with an output signal of the second resistance wire portion W2.

Further, as illustrated in FIG. 5, in the present example embodiment, a central angle θ of the gap w14 in the circumferential direction between the first regions Ra, Rb, Rc, and Rd adjacent to each other in the circumferential direction is equal to a central angle θ of the gap w24 in the circumferential direction between the second regions Re, Rf, Rg, and Rh adjacent to each other in the circumferential direction. In this way, a difference between an output signal of the first resistance wire portion W1 and an output signal of the second resistance wire portion W2 can be further reduced. Therefore, a state of the resistance wire 412 can be diagnosed more accurately by comparing an output signal of the first resistance wire portion W1 with an output signal of the second resistance wire portion W2.

As illustrated in FIG. 5, in the present example embodiment, an interval d0 in the radial direction between the first resistance wire portion W1 and the second resistance wire portion W2 is narrower than both a width d1 in the radial direction of the first regions Ra, Rb, Rc, and Rd and a width d2 in the radial direction of the second regions Re, Rf, Rg, and Rh. As described above, when the interval d0 in the radial direction between the first resistance wire portion W1 and the second resistance wire portion W2 is reduced, a difference in influence depending on a position in the radial direction between an output signal of the first resistance wire portion W1 and an output signal of the second resistance wire portion W2 can be reduced as compared with a case where the interval d0 in the radial direction between the first resistance wire portion W1 and the second resistance wire portion W2 is large. Therefore, a state of the resistance wire 412 can be diagnosed more accurately by comparing an output signal of the first resistance wire portion W1 with an output signal of the second resistance wire portion W2.

As illustrated in FIG. 5, in the present example embodiment, the interval d0 in the radial direction between the first resistance wire portion W1 and the second resistance wire portion W2 is narrower than both an interval d3 between the first regions Ra, Rb, Rc, and Rd adjacent to each other in the circumferential direction and an interval d4 between the second regions Re, Rf, Rg, and Rh adjacent to each other in the circumferential direction. As described above, when the interval d0 in the radial direction between the first resistance wire portion W1 and the second resistance wire portion W2 is reduced, a difference in influence depending on a position in the radial direction between an output signal of the first resistance wire portion W1 and an output signal of the second resistance wire portion W2 can be reduced as compared with a case where the interval d0 in the radial direction between the first resistance wire portion W1 and the second resistance wire portion W2 is large. Therefore, a state of the resistance wire 412 can be diagnosed more accurately by comparing an output signal of the first resistance wire portion W1 with an output signal of the second resistance wire portion W2.

Resistance values of a plurality of the first regions Ra, Rb, Rc, and Rd may be equal to each other. Further, resistance values of a plurality of the second regions Re, Rf, Rg, and Rh may be equal to each other. This can reduce a difference between an output signal of the first resistance wire portion W1 in a normal state and an output signal of the second resistance wire portion W2 in a normal state. Therefore, a state of the resistance wire 412 can be diagnosed more accurately by comparing an output signal of the first resistance wire portion W1 with an output signal of the second resistance wire portion W2.

In the present example embodiment, the first resistance wire portion W1 has four of the first regions Ra, Rb, Rc, and Rd. The first bridge circuit C1 is a full bridge circuit including four of the first regions Ra, Rb, Rc, and Rd. However, the first resistance wire portion W1 may also have only two first regions. In this case, the first bridge circuit C1 may be a half bridge circuit including the two first regions and two fixed resistors.

In the present example embodiment, the second resistance wire portion W2 has four of the second regions Re, Rf, Rg, and Rh. The second bridge circuit C2 is a full-bridge circuit including four of the second regions Re, Rf, Rg, and Rh. However, the second resistance wire portion W2 may also have only two second regions. In this case, the second bridge circuit C2 may be a half bridge circuit including the two second regions and two fixed resistors.

As described above, cyclic flexural deformation occurs in the annular body 20 when the wave reducer 1 is driven. Therefore, an output signal of the first resistance wire portion W1 and an output signal of the second resistance wire portion W2 include a component reflecting torque originally to be measured and an error component (ripple error) caused by cyclic flexural deformation of the annular body 20. The ripple error changes according to a rotation angle of rotational motion input to the annular body 20.

In view of the above, the detection circuit 42 of the present example embodiment performs correction processing (ripple correction) for canceling the ripple error. Hereinafter, this ripple correction will be described.

As illustrated in FIG. 5, the resistance wire 412 of the present example embodiment further includes a third resistance wire portion W3. The third resistance wire portion W3 is a resistance wire portion for detecting a rotation angle of rotational motion input to the annular body 20.

The third resistance wire portion W3 has a plurality of third regions Ri, Rj, Rk, Rl, Rm, Rn, Ro, and Rp. In the present example embodiment, the third resistance wire portion W3 has eight of the third regions Ri, Rj, Rk, Rl, Rm, Rn, Ro, and Rp. A plurality of the third regions Ri, Rj, Rk, Rl, Rm, Rn, Ro, and Rp are arranged at intervals in the circumferential direction. In the present example embodiment, eight of the third regions Ri, Rj, Rk, Rl, Rm, Rn, Ro, and Rp are arranged at equal intervals in the circumferential direction. Each of a plurality of the third regions Ri, Rj, Rk, Rl, Rm, Rn, Ro, and Rp is formed by one conductive wire. Each of the third regions Ri, Rj, Rk, Rl, Rm, Rn, Ro, and Rp expands in an arc shape along the circumferential direction.

Each of the third regions Ri, Rj, Rk, Rl, Rm, Rn, Ro, and Rp includes a region in which a third portion r3 is repeatedly arranged. The third portion r3 extends in the circumferential direction and is repeatedly arranged in the radial direction. However, the third portion r3 may extend in the radial direction and be repeatedly arranged in the circumferential direction.

Figure 11:
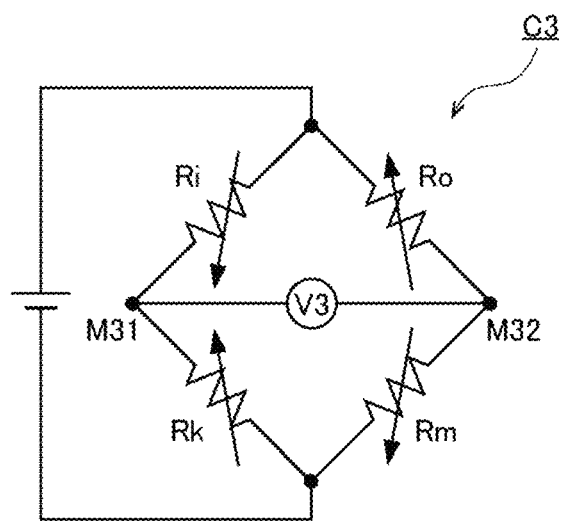
FIG. 11 is a circuit diagram of a third bridge circuit according to an example embodiment of the present disclosure.

Among eight of the third regions Ri, Rj, Rk, Rl, Rm, Rn, Ro, and Rp, four of the third regions Ri, Rk, Rm, and Ro that are not adjacent to each other are connected to each other to form the third bridge circuit C3. FIG. 11 is a circuit diagram of the third bridge circuit C3. As illustrated in FIG. 11, the third region Ri and the third region Rk are connected in series in this order. The third region Ro and the third region Rm are connected in series in this order. Then, columns of two of the third regions Ri and Rk and columns of two of the third regions Ro and Rm are connected in parallel between a positive pole and a negative pole of power supply voltage. Further, an intermediate point M31 between two of the third regions Ri and Rk and an intermediate point M32 between two of the third regions Ro and Rm are connected to a third voltmeter V3.

Figure 12:
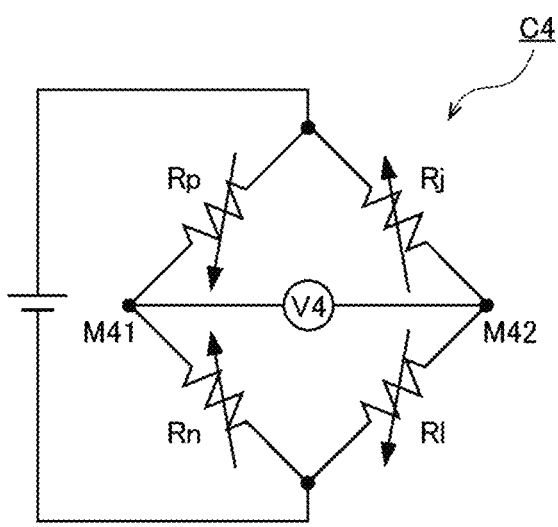
FIG. 12 is a circuit diagram of a fourth bridge circuit according to an example embodiment of the present disclosure.

Among eight of the third regions Ri, Rj, Rk, Rl, Rm, Rn, Ro, and Rp, the remaining four of the third regions Rj, Rl, Rn, and Rp are connected to each other to form a fourth bridge circuit C4. FIG. 12 is a circuit diagram of the fourth bridge circuit C4. As illustrated in FIG. 12, the third region Rp and the third region Rn are connected in series in this order. The third region Rj and the third region Rl are connected in series in this order. Then, columns of two of the third regions Rp and Rn and columns of two of the third regions Rj and Rl are connected in parallel between a positive pole and a negative pole of power supply voltage. Further, an intermediate point M41 between two of the third regions Rp and Rn and an intermediate point M42 between two of the third regions Rj and Rl are connected to a fourth voltmeter V4.

When the wave reducer 1 is driven, a portion extending in the circumferential direction (hereinafter referred to as an "extension portion") and a portion contracting in the circumferential direction (hereinafter referred to as a "contraction portion") are generated in the base portion 231 of the annular body 20. Specifically, two extension portions and two contraction portions are alternately generated in the circumferential direction. That is, the extension portion and the contraction portion are alternately generated at intervals of 90° in the circumferential direction around the central axis 9. Then, a location where the extension portion and the contraction portion are generated rotates at the first rotational speed.

Resistance values of eight of the third regions Ri, Rj, Rk, Rl, Rm, Rn, Ro, and Rp change according to extension and contraction of the base portion 231 in the circumferential direction. For example, when the above-described extension portion overlaps a certain one of the third regions, a resistance value of the third region decreases. When the above-described contraction portion overlaps a certain one of the third regions, a resistance value of the third region increases.

In the example of FIG. 5, when the contraction portion overlaps the third regions Ri and Rm, the extension portion overlaps the third regions Rk and Ro. When the extension portion overlaps the third regions Ri and Rm, the contraction portion overlaps the third regions Rk and Ro. Therefore, in the third bridge circuit C3, the third regions Ri and Rm and the third regions Rk and Ro show resistance value changes in opposite directions.

In the example of FIG. 5, when the contraction portion overlaps the third regions Rp and Rl, the extension portion overlaps the third regions Rn and Rj. When the extension portion overlaps the third regions Rp and Rl, the contraction portion overlaps the third regions Rn and Rj. Therefore, in the fourth bridge circuit C4, the third regions Rp and Rl and the third regions Rn and Rj show resistance value changes in opposite directions.

Figure 13:
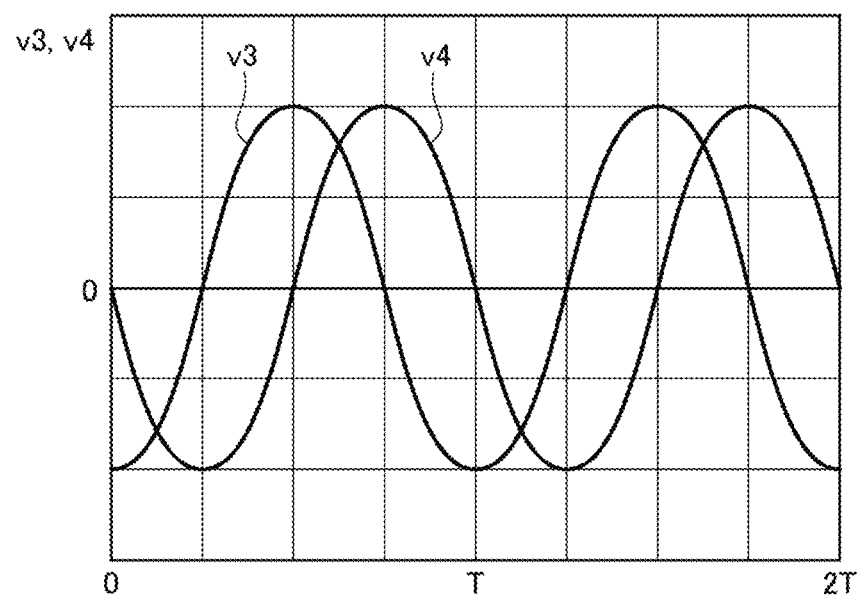
FIG. 13 is a graph illustrating a measurement value of the third bridge circuit and a measurement value of the fourth bridge circuit.

FIG. 13 is a graph illustrating a measurement value v3 of the third voltmeter V3 of the third bridge circuit C3 and a measurement value v4 of the fourth voltmeter V4 of the fourth bridge circuit C4. The horizontal axis of the graph of FIG. 13 represents time. The vertical axis of the graph of FIG. 13 represents a voltage value. When the wave reducer 1 is driven, sinusoidal measurement values v3 and v4 that periodically change are output from the third voltmeter V3 and the fourth voltmeter V4, respectively, as illustrated in FIG. 13. A period T of the measurement values v3 and v4 corresponds to ½ times a period of the first rotational speed. A direction of input rotational motion can be determined based on whether a phase of the measurement value v4 of the fourth voltmeter V4 is advanced by ⅛ period (¼ period of the measurement values v3 and v4) of the first rotational speed or delayed by ⅛ period (¼ period of the measurement values v3 and v4) of the first rotational speed with respect to a phase of the measurement value v3 of the third voltmeter V3.

The detection circuit 42 can detect a rotation angle of rotational motion input to the annular body 20 based on the measurement value v3 of the third voltmeter V3 and the measurement value v4 of the fourth voltmeter V4. Specifically, for example, the detection circuit 42 includes a storage unit that stores a function table in which a combination of the measurement value v3 of the third voltmeter V3 and the measurement value v4 of the fourth voltmeter V4 is associated with a rotation angle. The detection circuit 42 outputs a rotation angle by inputting the measurement values v3 and v4 to the function table.

The ripple error changes sinusoidally with respect to a rotation angle of the annular body 20. The detection circuit 42 calculates the above-described ripple error according to the output rotation angle. After the above, an output signal of the first resistance wire portion W1 and an output signal of the second resistance wire portion W2 are corrected using the calculated ripple error. As a result, the detection circuit 42 can output torque applied to the annular body 20 with higher accuracy.

As described above, the resistance wire 412 of the present example embodiment includes the third resistance wire portion W3. For this reason, a rotation angle of rotational motion input to the annular body 20 can be detected. Therefore, an output signal of the first resistance wire portion W1 and an output signal of the second resistance wire portion W2 can be corrected according to a rotation angle.

Note that the detection circuit 42 may multiply the measurement values v3 and v4 of the third voltmeter V3 and the fourth voltmeter V4 by a predetermined coefficient without calculating the rotation angle described above, and combine the measurement values v3 and v4 with an output signal of the first resistance wire portion W1 and an output signal of the second resistance wire portion W2. In this way, processing load on calculation of a rotation angle is reduced. Therefore, a calculation speed of the detection circuit 42 can be improved.

Further, in the present example embodiment, the gap w14 in the circumferential direction between the first regions Ra, Rb, Rc, and Rd adjacent to each other in the circumferential direction and the gap w24 in the circumferential direction between the second regions Re, Rf, Rg, and Rh adjacent to each other in the circumferential direction are arranged at the same position in the circumferential direction as a gap w34 in the circumferential direction between the third regions Ri and Rp adjacent to each other in the circumferential direction. In this way, a wiring can be easily drawn radially outward using the gaps w14, w24, and w34.

In the present example embodiment, the third resistance wire portion W3 is arranged radially outside the first resistance wire portion W1 and the second resistance wire portion W2. However, the third resistance wire portion W3 may be arranged radially inside the first resistance wire portion W1 and the second resistance wire portion W2. The third resistance wire portion W3 may be arranged radially outside the first resistance wire portion W1 and radially inside the second resistance wire portion W2.

Among four of the third regions Ri, Rk, Rm, and Ro described above, two of the third regions Ri and Rk or two of the third regions Rm and Ro may be omitted. Even in this case, an output value according to a rotation angle can be obtained by constituting the third bridge circuit C3 as a half bridge circuit using two fixed resistors. Similarly, among four of the third regions Rj, Rl, Rn, and Rp described above, two of the third regions Rj and Rl or two of the third regions Rn and Rp may be omitted. Even in this case, an output value according to a rotation angle can be obtained by constituting the fourth bridge circuit C4 as a half bridge circuit using two fixed resistors.

That is, the third resistance wire portion W3 only needs to have four or more of the third regions. In this manner, a rotation angle and a rotation direction of rotational motion input to the annular body 20 can be detected.

A resistance value of the first resistance wire portion W1 and a resistance value of the second resistance wire portion W2 slightly change according to temperature of the resistance wire 412. Therefore, an output signal of the first resistance wire portion W1 and an output signal of the second resistance wire portion W2 include an error component (temperature error) caused by temperature. In view of the above, the detection circuit 42 of the present example embodiment performs correction processing (temperature correction) for canceling the temperature error. Hereinafter, this temperature correction will be described.

As illustrated in FIG. 5, the resistance wire 412 of the present example embodiment further includes a fourth resistance wire portion W4. The fourth resistance wire portion W4 is a resistance wire portion for detecting temperature of the resistance wire 412. The fourth resistance wire portion W4 includes a fourth portion r4. The fourth portion r4 extends in the circumferential direction. That is, the fourth portion r4 extends in an arc shape about the central axis 9. For this reason, a change in a resistance value of the fourth portion r4 due to torque in the circumferential direction is extremely small. Further, the fourth portion r4 extends over substantially the entire circumference around the central axis 9. For this reason, a resistance value of the fourth portion r4 is less likely to be affected by extension and contraction due to flexural deformation of the base portion 231. Accordingly, a resistance value of the fourth portion r4 is dominantly changed by temperature.

The detection circuit 42 measures a resistance value of the fourth portion r4. The measured resistance value is a signal reflecting temperature of the resistance wire 412. The detection circuit 42 corrects an output signal of the first resistance wire portion W1 and an output signal of the second resistance wire portion W2 based on the measured resistance value. Specifically, an output signal of the first resistance wire portion W1 and an output signal of the second resistance wire portion W2 are increased or decreased in a direction of canceling a change due to temperature. As a result, the detection circuit 42 can output torque applied to the annular body 20 with higher accuracy.

As described above, the resistance wire 412 of the present example embodiment includes the fourth resistance wire portion W4. For this reason, temperature of the resistance wire 412 can be detected. Therefore, an output signal of the first resistance wire portion W1 and an output signal of the second resistance wire portion W2 can be corrected according to temperature of the resistance wire 412.

In the present example embodiment, the fourth resistance wire portion W4 is arranged radially outside the first resistance wire portion W1 and the second resistance wire portion W2. However, the fourth resistance wire portion W4 may be arranged radially inside the first resistance wire portion W1 and the second resistance wire portion W2. The fourth resistance wire portion W4 may be arranged radially outside the first resistance wire portion W1 and radially inside the second resistance wire portion W2.

In the present example embodiment, the fourth resistance wire portion W4 is arranged radially outside the third resistance wire portion W3. However, the fourth resistance wire portion W4 may be arranged radially inside the third resistance wire portion W3.

In addition, the fourth resistance wire portions may be arranged in a double manner in the radial direction. In this case, an output signal of the first resistance wire portion W1 and an output signal of the second resistance wire portion W2 can be corrected by each of two of the fourth resistance wire portions. In this case, even if abnormality occurs in any of two of the fourth resistance wire portions, the abnormality can be detected immediately. Even if abnormality occurs in one of two of the fourth resistance wire portions, the other one of the fourth resistance wire portions can play a role of a temperature sensor.

Subsequently, a second example embodiment of the present disclosure will be described. Hereinafter, the same reference numerals as those in the first example embodiment are used to facilitate understanding of a correspondence relationship with the first example embodiment described above. Hereinafter, redundant description of a point equivalent to that of the first example embodiment will be omitted, and a difference from the first example embodiment will be mainly described.

Figure 14:
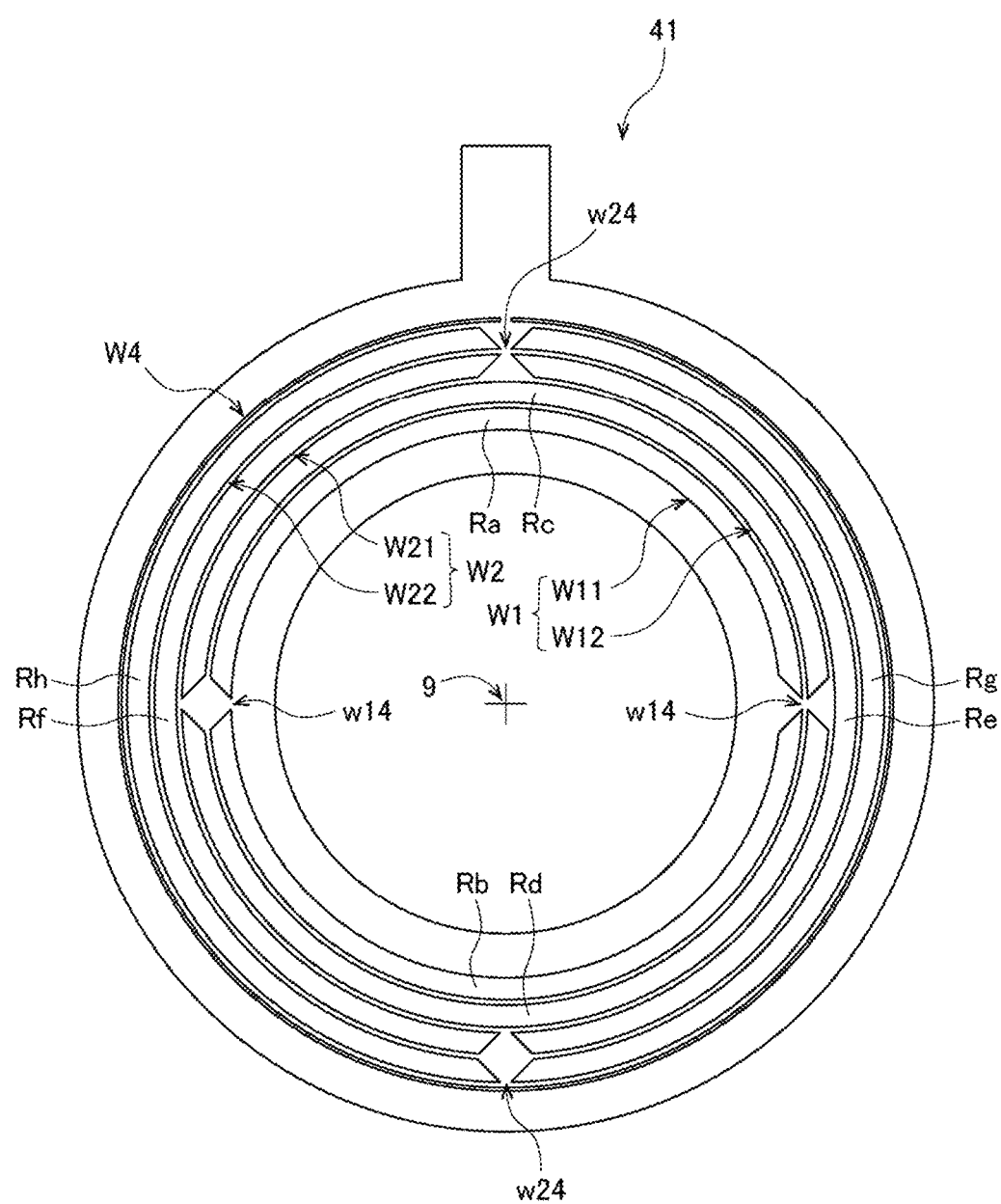
FIG. 14 is a plan view of the substrate according to a second example embodiment of the present disclosure.

FIG. 14 is a plan view of the substrate 41 according to the second example embodiment. In the second example embodiment, as illustrated in FIG. 14, the gap w14 in the circumferential direction between the first regions Ra, Rb, Rc, and Rd adjacent to each other in the circumferential direction of the first resistance wire portion W1 and the gap w24 in the circumferential direction between the second regions Re, Rf, Rg, and Rh adjacent to each other in the circumferential direction of the second resistance wire portion W2 are arranged in a manner shifted by a certain angle in the circumferential direction. In this way, influence depending on an angle in the circumferential direction occurs in a state of being shifted by a certain angle in an output signal of the first resistance wire portion W1 and an output signal of the second resistance wire portion W2. For this reason, based on an output signal of the first resistance wire portion W1 and an output signal of the second resistance wire portion W2, it is possible to obtain an output signal in which influence depending on an angle in the circumferential direction is reduced.

In the present example embodiment, the number of the first regions Ra and Rb included in the inner first resistance wire portion W11, the number of the first regions Rc and Rd included in the outer first resistance wire portion W12, the number of the second regions Re and Rf included in the inner second resistance wire portion W21, and the number of the second regions Rg and Rh included in the outer second resistance wire portion W22 are the same. Specifically, all of the number of the first regions Ra and Rb included in the inner first resistance wire portion W11, the number of the first regions Rc and Rd included in the outer first resistance wire portion W12, the number of the second regions Re and Rf included in the inner second resistance wire portion W21, and the number of the second regions Rg and Rh included in the outer second resistance wire portion W22 are two. Then, the gap w14 in the circumferential direction between the first regions Ra, Rb, Rc, and Rd adjacent to each other in the circumferential direction in the inner first resistance wire portion W11 and the outer first resistance wire portion W12 and the gap w24 in the circumferential direction between the second regions Re, Rf, Rg, and Rh adjacent to each other in the circumferential direction in the inner second resistance wire portion W21 and the outer second resistance wire portion W22 are arranged in a manner shifted by a certain angle in the circumferential direction.

In this way, influence depending on an angle in the circumferential direction occurs in a state of being shifted by a certain angle in an output signal of the first resistance wire portion W1 and an output signal of the second resistance wire portion W2. For this reason, for example, in a case where influence depending on an angle in the circumferential direction is in a cycle of 180°, it is possible to obtain an output signal in which influence depending on an angle in the circumferential direction is reduced based on an output signal of the first resistance wire portion W1 and an output signal of the second resistance wire portion W2.

In particular, in the present example embodiment, the above-described "certain angle" is 90°. In this way, a cycle of influence depending on an angle in the circumferential direction is shifted by 90° in an output signal of the first resistance wire portion W1 and an output signal of the second resistance wire portion W2. For this reason, by taking the sum of an output signal of the first resistance wire portion W1 and an output signal of the second resistance wire portion W2, influence depending on an angle in the circumferential direction in a cycle of 180° can be canceled.

Figure 15:
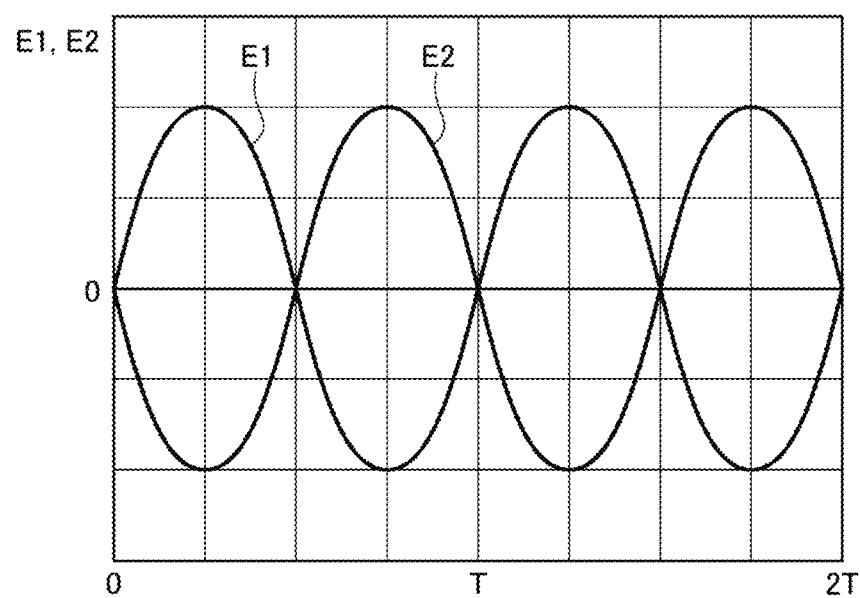
FIG. 15 is a graph illustrating temporal changes of a ripple error of the first resistance wire portion and a ripple error of the second resistance wire portion according to a second example embodiment of the present disclosure.

FIG. 15 is a graph illustrating temporal changes of the ripple error E1 of the first resistance wire portion W1 and the ripple error E2 of the second resistance wire portion W2. The horizontal axis of the graph of FIG. 15 represents time. The vertical axis of the graph of FIG. 15 represents a value obtained by normalizing voltage representing a ripple error. These ripple errors E1 and E2 correspond to the above-described "influence depending on an angle in the circumferential direction". As described above, in the present example embodiment, the gap w14 in the circumferential direction between the first regions Ra, Rb, Rc, and Rd adjacent to each other in the circumferential direction and the gap w24 in the circumferential direction between the second regions Re, Rf, Rg, and Rh adjacent to each other in the circumferential direction are arranged by being shifted by 90° in the circumferential direction. For this reason, the ripple error E1 of the first resistance wire portion W1 and the ripple error E2 of the second resistance wire portion W2 have waveforms shifted by a half cycle. Therefore, the ripple error E1 of the first resistance wire portion W1 and the ripple error E2 of the second resistance wire portion W2 have values that are always opposite in positive and negative and approximate as absolute values (inverted in positive and negative).

In this case, the detection circuit 42 can cancel the ripple errors E1 and E2 by calculating the sum of an output signal of the first resistance wire portion W1 and an output signal of the second resistance wire portion W2. For this reason, a detection value of torque applied to the base portion 231 can be output in a state in which a ripple error is reduced without performing the ripple correction as in the first example embodiment. As described above, in the present example embodiment, since ripple correction is unnecessary, the third resistance wire portion W3 can be omitted.

Although the first example embodiment and the second example embodiment of the present disclosure are described above, the present disclosure is not limited to the example embodiments.

In the above example embodiment, the resistance wire 412 is arranged on a surface of the insulating layer 411 that is flexibly deformable. However, the resistance wire 412 may be arranged on the surface 234 of the base portion 231. For example, an insulating film is formed on the surface 234 of the base portion 231, and a conductor layer is formed on a surface of the insulating film by sputtering or the like. Then, the resistance wire 412 may be formed by removing an unnecessary portion of the conductor layer by chemical means such as etching or physical means such as laser. For example, an inorganic insulating material is used for the insulating film.

The annular body 20 of the example embodiment is what is called a "hat-shaped" flexible external gear in which the base portion 231 expands radially outward from the body 21. The hat-shaped annular body 20 is excellent in that a space in the radial inside of the body 21 can be effectively used. However, the annular body 20 may be what is called a "cup-shaped" flexible external gear in which the base portion 231 expands radially inward from the body 21.

In the example embodiment, the wave reducer 1 mounted on the robot 100 is described. However, the wave reducer 1 having a similar structure may be mounted on another device such as an assist suit or an automatic guided vehicle.

The present disclosure can be used for, for example, an annular body, a wave reducer, a robot, and a torque detection device.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An annular body comprising:
   a base portion surrounding a central axis and expanding in a direction intersecting the central axis; and
   a resistance wire located in the base portion; wherein
   the resistance wire includes:
   a first resistance wire portion; and
   a second resistance wire portion located radially outside the first resistance wire portion;
   the first resistance wire portion includes:
   an inner first resistance wire portion; and
   an outer first resistance wire portion located radially outside the inner first resistance wire portion;
   the second resistance wire portion includes:
   an inner second resistance wire portion; and
   an outer second resistance wire portion located radially outside the inner second resistance wire portion;
   each of the inner first resistance wire portion and the outer first resistance wire portion includes first regions arranged at intervals in a circumferential direction;
   each of the first regions includes a region in which a first portion extending in both a radial direction and the circumferential direction is provided in the circumferential direction;
   each of the inner second resistance wire portion and the outer second resistance wire portion includes second regions arranged along the circumferential direction; and
   each of the second regions includes a region in which a second portion extending in both the radial direction and the circumferential direction is provided in the circumferential direction.

2. The annular body according to claim 1, wherein a gap in the circumferential direction between the first regions adjacent to each other in the circumferential direction and a gap in the circumferential direction between the second regions adjacent to each other in the circumferential direction are arranged at a same position in the circumferential direction.

3. The annular body according to claim 2, wherein
a total number of the first regions of the inner first resistance wire portion provided in the annular body, a total number of the first regions of the outer first resistance wire portion provided in the annular body, a total number of the second regions of the inner second resistance wire portion provided in the annular body, and a total number of the second regions of the outer second resistance wire portion provided in the annular body are the same; and
a gap in the circumferential direction between the first regions adjacent to each other in the circumferential direction in the inner first resistance wire portion, a gap in the circumferential direction between the first regions adjacent to each other in the circumferential direction in the outer first resistance wire portion, a gap in the circumferential direction between the second regions adjacent to each other in the circumferential direction in the inner second resistance wire portion, and a gap in the circumferential direction between the second regions adjacent to each other in the circumferential direction in the outer second resistance wire portion are arranged at a same position in the circumferential direction.

4. The annular body according to claim 2, wherein
the resistance wire further includes a third resistance wire portion;
the third resistance wire portion includes third regions arranged along the circumferential direction;
the third region includes a region in which multiple third portions are provided; and
the third portions extend in the radial direction and are located along the circumferential direction, or extend in the circumferential direction and are located along the radial direction.

5. The annular body according to claim 4, wherein the third resistance wire portion includes four or more of the third regions.

6. The annular body according to claim 4, wherein a gap in the circumferential direction between the first regions adjacent to each other in the circumferential direction and a gap in the circumferential direction between the second regions adjacent to each other in the circumferential direction are arranged at a same position in the circumferential direction as a gap in the circumferential direction between the third regions adjacent to each other in the circumferential direction.

7. The annular body according to claim 1, wherein a gap in the circumferential direction between the first regions adjacent to each other in the circumferential direction and a gap in the circumferential direction between the second regions adjacent to each other in the circumferential direction are shifted by a predetermined angle in the circumferential direction.

8. The annular body according to claim 7, wherein
a total number of the first regions of the inner first resistance wire portion provided in the annular body, a total number of the first regions of the outer first resistance wire portion provided in the annular body, a total number of the second regions of the inner second resistance wire portion provided in the annular body, and a total number of the second regions of the outer second resistance wire portion provided in the annular body are the same; and
a gap in the circumferential direction between the first regions adjacent to each other in the circumferential direction in the inner first resistance wire portion and the outer first resistance wire portion, and a gap in the circumferential direction between the second regions adjacent to each other in the circumferential direction in the inner second resistance wire portion and the outer second resistance wire portion are shifted by a predetermined angle in the circumferential direction.

9. The annular body according to claim 7, wherein the predetermined angle is 90°.

10. The annular body according to claim 1, wherein the first resistance wire portion and the second resistance wire portion are concentrically arranged about the central axis.

11. The annular body according to claim 10, wherein an angle of a gap in the circumferential direction between the first regions adjacent to each other in the circumferential direction is equal to an angle of a gap in the circumferential direction between the second regions adjacent to each other in the circumferential direction.

12. The annular body according to claim 1, wherein a gap in the radial direction between the first resistance wire portion and the second resistance wire portion is narrower than both a width in the radial direction of the first region and a width in the radial direction of the second region.

13. The annular body according to claim 1, wherein a gap in the radial direction between the first resistance wire portion and the second resistance wire portion is narrower than both a gap between the first regions adjacent to each other in the circumferential direction and a gap between the second regions adjacent to each other in the circumferential direction.

14. The annular body according to claim 1, wherein
the first resistance wire portion further includes a first connection region connected to a plurality of the first regions;
a first bridge circuit including a plurality of the first regions is connected via the first connection region;
the second resistance wire portion further includes a second connection region connected to a plurality of the second regions; and
a second bridge circuit including a plurality of the second regions is connected via the second connection region.

15. The annular body according to claim 1, wherein
the resistance wire further includes a fourth resistance wire portion; and
the fourth resistance wire portion includes a fourth portion extending in the circumferential direction.

16. A wave reducer comprising:
the annular body according to claim 1;
a wave generator; and
an internal gear; wherein
the annular body includes:
a body having a cylindrical shape extending in an axial direction from a radial end portion of the base portion; and
external teeth protruding radially outward from a radially outer surface of the body;
the wave generator is located radially inside the external teeth;
the internal gear is located radially outside the external teeth;
the internal gear includes internal teeth protruding radially inward from a radially inner surface; and
a portion of the external teeth meshes with a portion of the plurality of internal teeth.

17. An industrial robot comprising the wave reducer according to claim 16.

18. A torque detection device comprising:
a resistance wire arranged in a circumferential direction with respect to a central axis; and
a detection circuit electrically connected to the resistance wire; wherein
the resistance wire includes:
   a first resistance wire portion; and
   a second resistance wire portion located radially outside the first resistance wire portion;
the first resistance wire portion includes:
   an inner first resistance wire portion; and
   an outer first resistance wire portion located radially outside the inner first resistance wire portion;
the second resistance wire portion includes:
   an inner second resistance wire portion; and
   an outer second resistance wire portion located radially outside the inner second resistance wire portion;
each of the inner first resistance wire portion and the outer first resistance wire portion includes first regions arranged at intervals in the circumferential direction;
each of the first regions includes a region in which a first portion extending in both a radial direction and the circumferential direction is provided in the circumferential direction;
each of the inner second resistance wire portion and the outer second resistance wire portion includes second regions arranged at intervals in the circumferential direction;
each of the second regions includes a region in which a second portion extending in both the radial direction and the circumferential direction is provided in the circumferential direction;
the first resistance wire portion further includes a first connection region connected to a plurality of the first regions;
a first bridge circuit is formed by a plurality of the first regions connected via the first connection region;
the second resistance wire portion further includes a second connection region connected to a plurality of the second regions;
a second bridge circuit is defined by a plurality of the second regions connected via the second connection region;
resistance values of the first portion and the second portion change according to torque applied to a region where the resistance wire is arranged; and
the detection circuit is configured to compare an output signal of the first bridge circuit with an output signal of the second bridge circuit to output a diagnostic signal indicating a state of the resistance wire.

19. The torque detection device according to claim 18, wherein the detection circuit is configured to output a predetermined signal as the diagnostic signal in a case where a difference between an output signal of the first bridge circuit and an output signal of the second bridge circuit is equal to or more than a predetermined threshold.

20. The torque detection device according to claim 18, wherein the detection circuit is configured to output a signal based on a sum of an output signal of the first bridge circuit and an output signal of the second bridge circuit.

* * * * *